Patented June 28, 1949

2,474,325

UNITED STATES PATENT OFFICE 2,474,325

AQUEOUS LUBRICANT

Thomas T. Rodgers, Milwaukee, Wis.; Thomas T. Rodgers, Jr., executor of said Thomas T. Rodgers, Sr., deceased No Drawing. Application April 7, 1943, Serial No. 482,114

4 Claims. (Cl. 252—49.3)

This invention relates to specialized fluids having lubricating properties and especially adapted to facilitate the removal of metal by machining operations and it resides in a composition and a method of employing the same, which are novel in that a single phase, aqueous solution, as contrasted with an aqueous emulsion is employed as the sole fluid medium relied upon to produce the lubricating and coolant action. In its more particular aspects the invention arises out of the discovery that certain organic chemical bodies containing chlorine within the molecule and soluble in water have, while in water solution, a marked lubricating effect which is of utility for certain special lubricating purposes where true miscibility in water is an advantage and particularly useful under conditions prevailing when metal is being removed in a machining operation where high heat capacity and high thermal conductivity is an advantage.

Among the objects of this invention, one is to provide a lubricating coolant which permits the maintenance of lower working temperatures in a part being machined and in the tool, as compared with the temperatures occurring under like conditions when lubricating coolants as heretofore known are employed.

Another object of this invention is to provide a lubricant of the aqueous type free of any material existing in an oily phase and thus capable of dilution with water without segregation, and therefor of tactical advantage for naval purposes because of the avoidance of oily surface tracks and traces.

Another object of this invention is to provide a lubricant composition possessing extreme pressure characteristics to a very high degree.

In its general aspects this invention depends upon the employment in aqueous solution of an organic substance containing within the molecule a polar end group which is strongly water attractable, such for example as a carboxylic group neutralized by an alkali metal, or a nitrogen base, said substance also containing within the molecule a lubric group modified by inclusion therein of one or more atoms of a halogen. The halogen is so located within the molecule as to render the substance of sufficient stability to facilitate its use for the purpose intended, and the lubric and water attractable groups are so balanced that the substance is soluble in water. As an additional ingredient of the composition a stabilizing substance usually of basic character may be included to inhibit or delay the decomposition of the principal ingredient and to combine with any acidic products which may result from loss of halogen from the principal ingredient.

A wide range of substances having the characteristics detailed above may be formulated for the purpose, but these fall for convenience in classification into two principal groups, namely those substances in which the halogen substituted lubric part of the molecule is aliphatic, and those in which it is cyclic. In the case of those substances in which the lubric portion of the molecule is of high molecular weight the water attracted group within the molecule is of considerable importance. However, when the halogenated group is of lower molecular weight the halogen itself may even be sufficiently effective in producing water soluble characteristics to act as the water attractable group itself.

As a specific instance of the principal ingredient of this invention of the aliphatic type, a fatty acid such as commercial stearic acid, while molten, may be chlorinated by direct contact with chlorine until the quantity of chlorine absorbed amounts to approximately 6 atom equivalents for each molecule of stearic acid. The acid chlorinated in the manner described may then be combined with basic material to neutralize the carboxyl group, and for this purpose I prefer to employ a relatively weaker basic group, such for example as triethanolamine since the substance when thus neutralized exhibits a smaller tendency for decomposition with elimination of chlorine. The neutralized chlorinated acid is then made up into a water solution together with an excess of triethanolamine, the latter being present in a quantity of approximately one to four molecular equivalents of triethanolamine to one molecular equivalent of neutralized chlorinated acid, although the preferable ratio is 3½ mols of free triethanolamine to 1 mol of neutralized chlorinated acid. For the various practical uses the solution may be prepared to contain from about 0.1% to 10% of the neutralized chlorinated acid, and 0.1% to 20% of free triethanolamine, and in such form is complete ready for use as a lubricant or lubricating coolant medium. The solution also is of some usefulness without any stabilizing medium such as triethanolamine, but both lubricity and stability appears to be enhanced through its employment.

As equivalents of the chlorine employed in preparing the composition above described bromine and iodine may be substituted to produce a composition having the same desirable characteristics. To a lesser extent fluorine may also be substituted, but substances containing fluorine are not preferred because of greater instability and because of health hazards, which may be involved in the employment of a fluorine containing substance. However, under special circumstances conditions may arise in which the fluorine containing substances will have some utility and it is intended therefore to include all the halogens within the more general protection to be granted hereunder. It is further to be noted that the degree of halogenation, that is to say the number of halogen atoms introduced into the molecule may be varied with some variation in degree but not in the kind of result obtained.

The substances to be employed for the neutralization of the carboxyl group may be those which simply replace the acid hydrogen thereof, such for example as the alkali metals, sodium potassium, rubidium and caesium, or ammonia, or amino bases including amines or amino and ammonium derivatives. The nitrogen bases, being weaker, are preferred since they appear to form more stable compounds for the purpose. Where salts are referred to herein they are salts formed from the substances here named.

It is also contemplated that the carboxyl group can be modified otherwise than by simple neutralization, as for example by interaction with an amine or derivative thereof under conditions bringing about dehydration so that the resulting substance is in the form of an amino amide of the halogenated aliphatic acid. For many purposes substances prepared in this way are preferable since they are soluble in an aqueous medium, which may be either alkaline or acid, and further for the reason that such substances do not easily form insoluble metallic soaps of halogenated stearic acid. In such cases of course the basic stabilizing ingredient is dispensed with.

In the place of stearic acid as the starting material, mixed fatty acids may be employed or fatty acids of greater or less molecular weight, either saturated or unsaturated, although the saturated acids provide more satisfactory material, both from the standpoint of stability and from the standpoint of solubility in the aqueous medium. The preferable range of types of fatty acid suitable is from those containing 8 carbon atoms to those containing 18 carbon atoms.

The substances described above, when contained in aqueous solution in accordance with this invention, all appear to give rise to so called "extreme pressure' characteristics. As illustrative of this property the method of this invention has been carried out using the compositions of this invention in a standardized lubricant testing appliance known as the "Falex" testing machine. In such machine a cylindrical journal is embraced by a pair of oppositely approaching V-blocks or jaws, which are caused to bear against the journal with forces of known and regulated intensity. The journal is driven at predetermined speed through means which permit measurement of the prevailing torque; the drive being through a shearing pin susceptible of destruction at a predetermined limiting torque in the neighborhood of 150 lb. inches. One common method of employment of this device is to operate the journal within the jaws while immersed in lubricant to be tested and while so doing increasing and noting the force with which the jaws bear against the journal, at the same time keeping track of the amount of torque involved until the moment of destruction of the shearing device through which the journal is being turned. Several examples of the composition of this invention were tested in this manner and the results of these tests are set forth in the following table, which states opposite the names of particular substances employed the jaw pressures at which failure of the shearing device occurred in the standard "Falex" testing machine as well as the torque prevailing at a jaw load of 3000 lbs. For the purpose of comparison there is also set forth a table giving equivalent data for high grade lubricants of the oily type including a well known emulsion cutting coolant of the type called "soluble oil." As an arbitrary matter it can be said that a lubricant which prevents the breaking of the pin at jaw loads in excess of 2000 lbs. is a good extreme pressure lubricant.

| Halogenated Substances in Water Solution | Jaw Pressure Required to Break Shear Pin | Torque at 3,000 lb. Jaw Pressure, lb. inches |
| --- | --- | --- |
| Triethanolamine salt of chlor-stearic acid. | In excess of 3,750 lb. | 76 |
| Triethanolamine salt of Iodo-Stearic acid. | 3,250 lb. | 58 |
| Ammonium salt of chlorstearic acid. | In excess of 4,500 lb. | 63 |

| Known Lubricants of the Oily Type for Comparison | Jaw Pressure Required to Break Shear Pin | Torque at 3000 lb. Jaw Pressure, lb. inches |
| --- | --- | --- |
| | Pounds | |
| Ordinary Refined Petroleum. | 950 | Beyond Pin Failure. |
| Lard Oil [1] | 2,500 | Do. |
| Sulphurized and Chlorinated Lard Oil.[1] | 2,100 | Do. |
| Water emulsion called Soluble Oil.[1] | 2,750 | Do. |

[1] Recognized as having high extreme pressure characteristics.

The marked extreme pressure characteristics of the compositions of this invention as demonstrated by the comparisons set forth in the above table, while not exhibited to the same degree by all substances within the scope of the discovery is fairly characteristic and possibly is due to two factors. First, the existence of the substance in aqueous solution may enhance the lubricity or strength of the film under extreme pressure, and second, the lower temperatures at which the film operates may improve its strength since the "Falex" testing machine is not a constant temperature device and the aqueous composition of this invention may delay the rise in temperature because of greater heat capacity and greater thermal conductivity. For this reason when a coolant-lubricant is in actual practical use in machining, conditions are encountered which are sufficiently similar to those occurring in the "Falex" testing apparatus, so that the results set forth in the above table are fairly reflective of the practical advantages of the compositions and methods of this invention in a machining operation.

In actual machining it has been found that for any given rate of removal of metal, a markedly improved condition of finish on the work can be obtained through this invention because of the improved lubricating effect, and at the same time a marked increase in accuracy may be obtained, where precision is a consideration, by reason of the relatively smaller rise in temperature of the work. Where increased production is desired for any given quality of finish, or degree of precision, the same can be accomplished through this invention with machines designed for sufficient energy output. Under such conditions the rate of removal of metal may be largely increased without loss in quality of the finish or of the precision of the part produced. It has also been found that through the use of this invention certain alloys which are very obstinate and difficult to machine can be machined with a resulting quality of workmanship heretofore unattainable with such alloys, and the life of the tool may be increased. These effects are more easily observed when the metal being machined is particularly hard or tough.

The composition of this invention is a true aqueous solution and not an emulsion of oily substances in water, and for this reason the lubricity of the composition is available and effective to a much greater degree. Also its viscosity is lower and where, as in a cutting operation, new surfaces are continually exposed, it flows, under the influence of capillary and surface effects, to the points required with far greater ease than an emulsion or a more viscous oil. Another marked advantage of the composition of this invention when the same is employed as a cutting coolant is its high heat capacity per unit volume as compared with coolants of the straight oil type, due to higher specific heat and higher density. Volume for volume the heat capacity of the compositions of this invention is from 2 to 3 times greater. This greater heat capacity together with higher thermal conductivity and higher film coefficients of heat transfer and lower boiling point give rise to a coolant effectiveness which is several times that of the best cutting oils. While some of the substances employed in this invention in water solution have been used heretofore in non-aqueous lubricant compositions, it does not appear that the same have heretofore been employed in aqueous solution, nor have the special results obtainable through the aqueous compositions of this invention been recognized nor availed of.

Also because of the aqueous character of the compositions of this invention they are characteristically completely miscible in water and if employed for lubricating shafts, etc., extending through the hulls of naval vessels they leave upon escape no oily trace upon the surface of the water. When used in fairly high concentration a very high degree of dilution can take place with little loss of lubricity and therefore, particularly when compounded with known inert materials capable of increasing viscosity, safe lubricants can be prepared in accordance with this invention for such purposes.

This invention has been herein described by reference to specific instances of its embodiment and use, the intention, however, being that the protection to be afforded be not unnecessarily limited thereby, the intent being that the protection granted shall extend to the full limits of the inventive advance disclosed herein as defined by the claims hereto appended.

I claim:

1. A lubricant composition entirely composed of a single phase homogeneous aqueous solution containing in solution from 0.1% to 10% of triethanolamine salt of halogenated stearic acid and 0.1% to 20% of a free amine.

2. A lubricant composition entirely composed of a single phase homogeneous aqueous solution containing in solution from 0.1% to 10% of amino amide of halogenated stearic acid and 0.1% to 20% of a free amine.

3. A lubricant composition entirely composed of a single phase homogeneous aqueous solution containing in solution from 0.1% to 10% of triethanolamine salt of chlorstearic acid and from 0.1% to 20% of free triethanolamine.

4. A lubricant composition entirely composed of a single phase homogeneous aqueous solution containing in solution from 0.1% to 10% of amino amide of chlorinated stearic acid and from 0.1% to 20% of free triethanolamine.

THOMAS T. RODGERS.

REFERENCES CITED

The following references are of record in the file of this patent:

UNITED STATES PATENTS

| Number | Name | Date |
|---|---|---|
| 1,992,689 | Cox | Feb. 26, 1935 |
| 2,060,138 | Taylor | Nov. 10, 1936 |
| 2,079,803 | Holtzclaw | May 11, 1937 |
| 2,172,533 | Freeman | Sept. 12, 1939 |
| 2,205,740 | Wunsch | June 25, 1940 |
| 2,225,365 | Bray | Dec. 17, 1940 |
| 2,225,366 | Bray | Dec. 17, 1940 |
| 2,225,367 | Bray | Dec. 17, 1940 |
| 2,279,688 | Larsen | Apr. 14, 1942 |

FOREIGN PATENTS

| Number | Country | Date |
|---|---|---|
| 2,043 | Great Britain | Aug. 17, 1863 |

OTHER REFERENCES

Technologic Papers of the Bureau of Standards #204, page 36 (1922).